Patented July 25, 1933

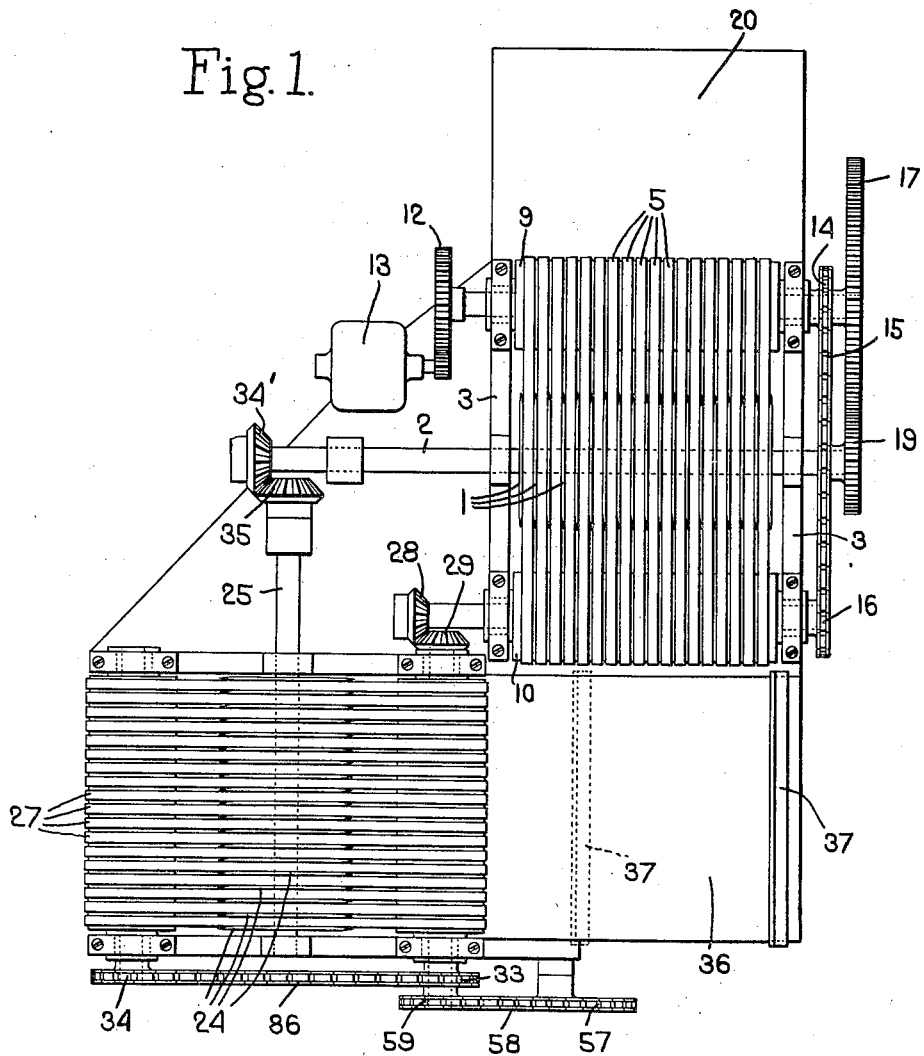

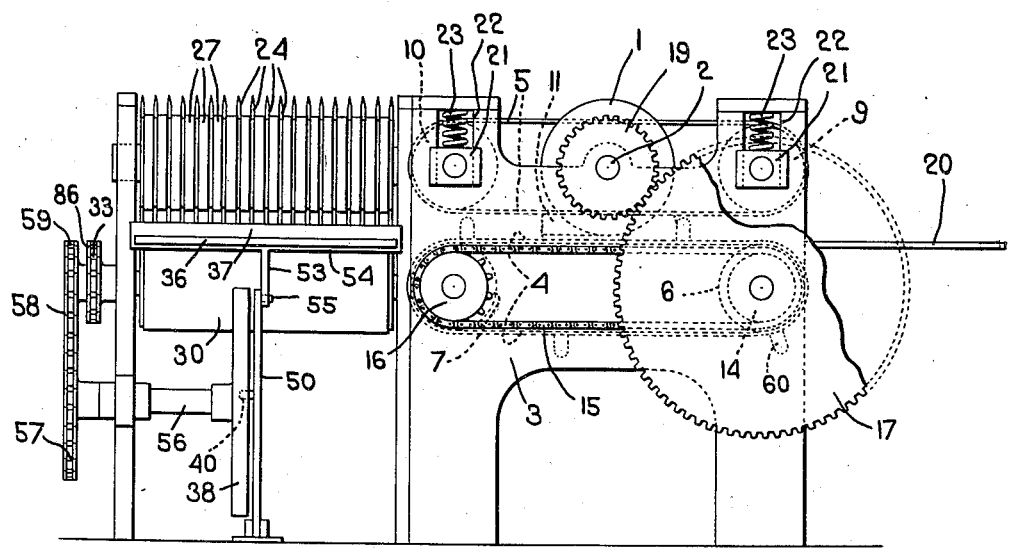
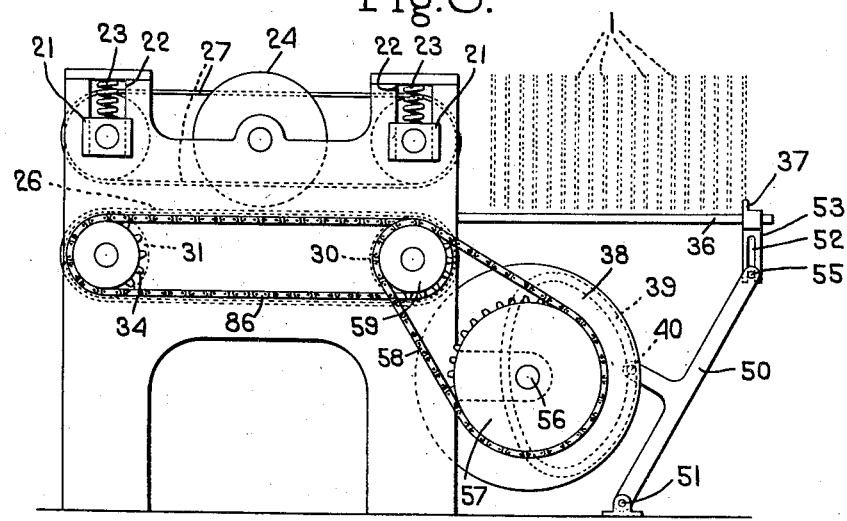

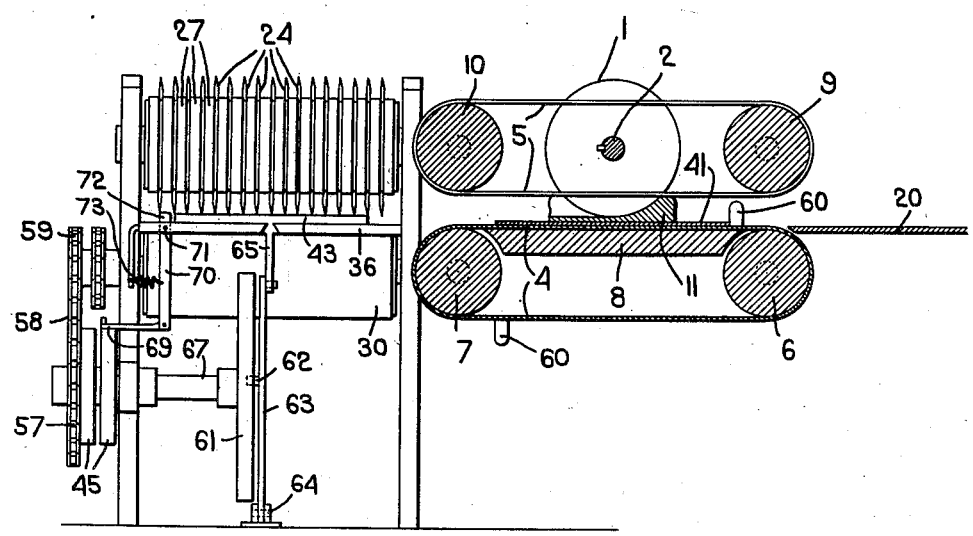
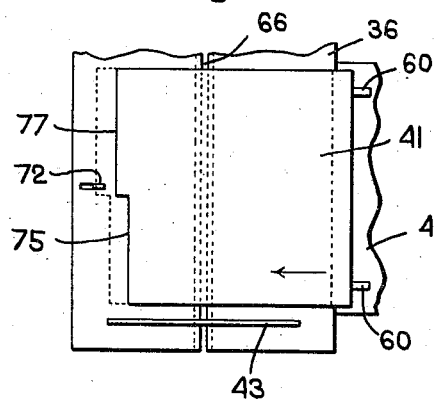

1,919,964

UNITED STATES PATENT OFFICE

JOSEPH P. SPANG, OF QUINCY, MASSACHUSETTS

MEAT-CUBING MACHINE

Application filed December 13, 1929. Serial No. 413,809.

This invention relates to meat-cubing machines for one of its objects to provide a meat-cubing machine which is constructed so that it is capable of an increased output and especially adapted to be operated by power.

In accordance with my invention I provide a gang of rotary cutting knives and employ endless belt feed devices for feeding the meat past the knives. The knives and the endless belts can be readily driven by power thereby speeding up the operation.

The device comprises two gangs of rotary cutting knives and the means for feeding the meat past the knives is such that the slits which are made in the meat by one set of knives will be at right angles to the other set of knives thereby cutting the meat into cubes.

In order to give an understanding of the invention I have illustrated in the drawings some selected embodiments thereof which will now be described after which the novel features will be pointed out in the appended claims.

Fig. 1 is a top plan view of a meat-cubing machine embodying my invention;

Fig. 2 is a side view of Fig. 1;

Fig. 3 is a side view of the second gang of cutting knives and the feeding means therefor;

Fig. 4 is a view similar to Fig. 2 showing a different embodiment of the invention and also showing the first slitting mechanism in section;

Fig. 5 is a fragmentary plan view of a part of Fig. 4.

In the drawings 1 indicates a gang of rotary slitting knives which are mounted on a shaft 2, the latter being supported in a suitable frame 3. The meat is fed past the knives through the medium of an endless feeding belt or apron 4 and a co-operating travelling stripper 5. The endless apron 4 passes around two rolls 6 and 7 and the upper run thereof beneath the knives is supported by a portion 8 of the frame. Situated above the rolls 6 and 7 are other rolls 9 and 10 around which pass a plurality of endless stripper elements 5, these elements being situated between the knives 1.

The rolls 6, 7, 9, 10 are operated to feed the meat 11 to be slit past the knives and at the same time the knives are rotated thereby to slit the meat. The knives are so adjusted that the meat 11 is not cut clear through but slits are cut in it nearly to the bottom.

Any appropriate way of operating the rolls and the knives may be adopted without departing from my invention. As herein shown the roll 6 has rigid therewith at one end thereof a gear 12 which is operatively connected to and driven by a suitable motor 13. At the other end said roll has a sprocket 14 with which meshes a sprocket chain 15 that runs over a sprocket wheel 16 on the end of the roll 7, these two rolls thus being connected together for simultaneous operation.

The shaft 2 carrying the rotary knives 1 is geared to the roll 6 so as to be driven thereby. This roll has fast thereon a large gear 17 which meshes with a smaller gear 19 on the shaft 2. This gearing arrangement provides for rotating the shaft 2 faster than the rolls so that the knives will have a rapid cutting movement.

20 indicates a loading table from which the slices of meat are delivered to the travelling apron 4. As fast as the meat is delivered it is fed by the apron 4 and slit by the knives 1.

During the travelling movement of the meat it is held on the apron 4 by the travelling stripper elements 5 which are arranged to travel at the same surface speed as the apron 4. These members 5 not only hold the meat on the apron while it is being slit but will also serve as strippers to strip the meat from the knives and prevent it from adhering thereto.

The rolls 9 and 10 are preferably yieldingly mounted so that they may yield slightly as the meat varies in thickness. These rolls are journalled in boxes 21 slidably mounted in ways 22 in the frame and are acted on by suitable springs 23 which hold them yieldingly in position.

In the cubing of meat it is desirable not only to cut a series of slits in one direction but also to cut an additional series of slits in another direction crossing the first slits, thereby cutting the steak into small cubes which, however, are all attached because the slits are not cut clear through the piece.

In order to accomplish this end I propose to provide a second slitting device similar to that above described and to provide means whereby after the meat has passed the first slitting device it will be fed through the second slitting device in such a way that said second slitting device will cut the slits in the meat at right angles to those cut by the first slitting device. This may be accomplished in a variety of ways without departing from the invention. As illustrating one means for accomplishing this end I have shown the two slitting devices arranged at right angles to each other and have provided suitable feeding means for feeding the meat from one slitting device to the other, the feeding being accomplished in such a way that the slits formed by the second slitting device are made in the meat at right angles to those formed by the first slitting device.

This second or additional slitting device comprises a gang of knives 24, which in the illustrated embodiment of the invention, are mounted on a shaft 25 which is situated at right angles to the shaft 2. The meat is fed past these knives 24 through an endless feeding apron 26 similar to the apron 4 and co-operating with this apron 26 is a travelling stripper or hold-down 27 similar to the element 5.

The travelling apron 26 may be operatively connected to the apron 4 and the shaft 25 may be operatively connected to the shaft 2 so both sets of slitting knives and both feeding aprons will be driven from the motor 13. For this purpose the roll 7 of the apron 4 has rigid therewith a bevelled gear 28 meshing with a bevelled gear 29 fast on one of the rolls 30 over which the apron 26 passes. The other roll 31 for said apron is driven from the roll 30 by means of a sprocket chain 36 which extends around sprocket wheels 33, 34 on said rolls 30 and 31 respectively.

The shaft 25 for the knives 24 is shown as connected to and driven by the shaft 2. For this purpose said shaft 2 has a bevelled gear 34' thereon which meshes with and drives a bevelled gear 35 on the shaft 25. 36 indicates a receiving platform onto which the pieces of meat 11 are deposited from the apron 4.

Various devices may be employed for transferring the meat from the platform 36 to the apron 26. In accordance with one embodiment of my invention this transfer is effected through a pusher 37 which is given a periodic movement from the full to the dotted line position Fig. 1, during which movement it will deliver any piece of meat deposited on the platform 36 to the feed apron 26. This pusher may be operated in any approved way and as illustrating one way I have shown a cam 38 which is connected to and actuated by the roll 30. The cam 38 is provided with a cam groove 39 in which operates a follower 40 connected to a swinging arm 50 that is pivoted at 51.

The upper end of the arm has a pin 55 operating in a vertical slot 52 formed in an arm 53 that depends from and is rigid with the pusher 37. This pusher is in the form of a slot having an opening therethrough of a size to receive the platform 36, the pusher, therefore, having the meat-pushing portion above the platform and the portion 54 on the under side of the platform from which the arm 51 depends.

For rotating the cam member 38 I have shown it as connected to the roll 30 through a sprocket chain drive. The cam 38 is fast on a shaft 56 journalled in the frame 3 and this shaft has rigid therewith a sprocket wheel 57 around which passes a sprocket chain 58, said chain meshing with a sprocket wheel 59 that is rigid with the roll 30. The sprocket wheel 57 is larger than the sprocket wheel 59 so that the rotary motion of the cam is slower than that of the roll 30.

The cam groove 39 is designed so that the pusher will have a dwell in its retracted position shown in full lines Figs. 1 and 3 and then will have a relatively quick forward and return movement, the extent of the forward movement being indicated by the dotted line position Fig. 1.

In using the device the operator will place the pieces of meat on the loading platform 20 and feed them to the apron 4. These pieces of meat will be carried past the slitting knives 1 and thus slit in one direction and will be deposited on the receiving platform 36.

From the receiving platform the pusher 37 feeds the meat to the apron 26, this direction of feed being at right angles to that given to the meat by the apron 4 and as the meat is carried beneath the knives 24 the second series of slits will be made therein, thereby completing cubing operation. It is understood that it will be necessary for the operator to feed the pieces of meat to the apron 4 in timed relation with the operation of the pusher 37.

Another way in which the pieces of meat may be handled is illustrated in Figs. 4 and 5. In this embodiment of the invention the slices of meat 11 are placed on a plate 41 preferably in the form of a sheet and this plate is carried beneath the slitting knives 1 by the apron 4 thereby slitting the meat 11. The plate 41 is prevented from slipping on the apron 4 by the projections 60 with which the apron is provided and which serve as pushers to positively carry the plate along with the apron.

When the plate 41 arrives at the receiving platform 36 it will automatically set in operation the means for transferring it to the apron 26 which is operating at right angles to the apron 4. Such means may conveniently be in the form of a pusher 43 which is movable toward and from the apron 26 but is normally in its retracted position.

This pusher is given its motion through the medium of a cam 61 similar to the cam 38 in Fig. 2, said cam having a cam groove therein in which is engaged a follower 62 carried by a swinging lever 63 pivoted at 64, the upper end of the lever having a pin and slot connection with an arm 65 rigid with the lever 63. In this embodiment the table 36 is provided with a slot 66 through which the arm 65 extends.

The cam 61 is shown as mounted on a shaft 67 which is driven from the sprocket wheel 57 through the medium of a one-revolution clutch indicated generally at 45. This clutch may be of any well-known construction and a detailed description thereof is not necessary. It is sufficient to say that the clutch is normally held disengaged by a clutch-controlling finger 69 and that when the finger 69 is retracted or withdrawn to the right Fig. 4 the clutch will be thrown into engagement and will make one revolution. This finger 69 is shown as connected to a lever 70 pivoted to the table 36 at 71 and projecting slightly above the table, the upper end 72 forming a tripping member. The lever is normally held in the full line position Fig. 1 through a spring 73.

When the plate 41 is fed onto the table 36 and is forced against the trip 72 the latter will be moved to the left Fig. 4 thereby withdrawing the clutch finger 69 and allowing the clutch to be thrown into operation. As soon as this occurs the pusher 43 will be given a forward movement which will carry the plate 41 with the meat thereon to the feed apron 26 so that the meat will be fed past the slitting knives 24.

The edge 77 of the plate 41 which engages the trip 72 is cut away as shown at 75. The purpose of this is to allow the clutch-controlling finger 69 to resume its normal position as soon as the pusher 43 has given the plate 41 an initial movement. This will allow the one-revolution clutch to throw itself out at the end of the first revolution because as soon as the plate 41 has been given an initial movement the portion 75 where the plate 41 is cut away is moved beyond the trip 72 thereby allowing the latter to return to its normal position.

Fig. 5 shows in full lines the plate 41 just before the completion of the movement which is given to it by the pusher 60 of the apron 4 and just before it engages the trip 72 and in dotted lines the position of the plate after it has actuated the trip 72.

While I have herein illustrated two gangs of slitting knives as arranged at right angles to each other yet this particular arrangement is not essential as the important thing is that there should be two gangs of knives and that the feeding arrangement for the meat should be such that when it is fed past the second gang of knives the slits cut thereby will be at substantially right angles to those formed by the knives of the first gang.

I claim.

1. In a meat-cubing machine, the combination with two gangs of rotary slitting knives, each rotating about a horizontal axis, said axis having an angular relation to each other, of an endless feeding apron situated beneath each gang of knives by which the meat to be cubed is fed past the knives, each apron moving in a direction at an angle to the direction of movement of the other apron, a receiving platform on which each piece of meat is received from the first apron, and means to transfer said meat to the second apron so that the slits cut therein by the second gang of knives will be at right angles to those cut by the first gang of knives.

2. In a meat-cubing machine, the combination with two gangs of rotary slitting knives, of a separate endless feed apron for each gang of knives, each feed apron being situated below but closely adjacent the corresponding gang of knives whereby as the meat to be cubed is fed past the knives the latter cuts slits partially through the meat, and automatically-operative means to transfer each piece of meat from one feed apron to the other.

3. In a meat-cubing machine, the combination with a gang of rotary slitting knives, of an endless feed apron for feeding the meat to be cubed past said knives, a receiving platform on which each piece of meat is received from said feed apron, a second endless feed apron arranged at right angles to the first-mentioned apron, automatically-operative means to transfer each piece of meat from said receiving platform to said second feed apron, and a second gang of rotary slitting knives arranged to slit the meat as it is fed along on the second feed apron with the slits arranged at right angles to those formed by the knives of the first gang.

4. In a meat-cubing machine, the combination with a gang of rotary slitting knives, of an endless feed apron for feeding the meat to be cubed past said knives, a receiving platform on which each piece of meat is received from said feed apron, a second endless feed apron arranged at right angles to the first-mentioned apron, a reciprocating pusher element to transfer each piece of meat from said receiving platform to said second feed apron, and a second gang of rotary slitting knives arranged to slit the meat as it is fed along on the second feed apron with the slits arranged at right angles to those formed by the knives of the first gang.

5. In a meat-slitting machine, the combination with two gangs of slitting knives, of an endless feeding apron for each gang of knives by which the meat to be slit is fed past the knives, said aprons moving in directions at an angle to each other and each gang of knives being arranged to cut slits in the meat extending in the direction of movement of the corresponding apron, and means to transfer said meat from one apron to the other, whereby the slits cut in the meat by the two gangs of knives will cross each other.

6. In a machine for slitting meat, the combination with two gangs of slitting knives, of an endless feeding apron for each gang of knives by which the meat to be slit is fed past said knives, said aprons moving in directions at right angles to each other, and each gang of knives being arranged to cut slits in the meat extending in the direction of movement of the corresponding apron, and means to transfer said meat from one apron to the other.

7. In a meat-slitting machine, the combination with a gang of slitting knives, of an endless feeding apron for feeding meat to be slit past said knives during which feeding operation the knives cut slits in the meat extending in the direction of the length of feed, a second gang of knives, a second endless feed apron for feeding the meat to be slit past said second set of knives, whereby the latter also cuts slits in the meat extending in the direction of the feeding movement of said second apron, and means between said aprons to receive meat from the first-named apron and deliver it to the second-named apron with the slits cut by the first-named gang of knives extending transversely of the line of movement of the second feed apron.

8. In a meat-slitting machine, the combination with two gangs of rotary slitting knives, each gang of knives rotating about a horizontal axis which is situated at right angles to the axis of the other gang of knives, of an endless feeding apron for each gang of knives by which the meat to be slit is fed past the knives, a receiving platform on which each piece of meat is received from the first apron, automatically-operative means to transfer said meat to the second apron so that the slits cut in the meat by the second gang of knives will be at right angles to those cut by the first gang of knives.

9. In a meat-slitting machine, the combination with two gangs of separate rotary slitting knives, of means co-operating with each gang of knives to feed a piece of meat past said knives so that the knives will cut slits partially through the meat, and automatically-operative means to transfer each piece of meat from one feeding means to the other.

10. In a meat-slitting machine, the combination with a gang of rotary slitting knives, of meat-feeding means to feed meat past said knives thereby to cause the knives to cut slits partially through the meat, a second series of rotary slitting knives, other meat-feeding means co-operating with said second series of knives to feed the meat past said knives to cause them to cut slits partially through the meat, and automatically-operative means to transfer the meat from the first-named feeding means to the second-named feeding means and to present said meat to said second-named feeding means with the slits cut by the first gang of knives extending transversely to the direction of movement of the second-named feeding means.

JOSEPH P. SPANG.